April 23, 1968 B. R. FIELD 3,379,953
AUTOMATIC BATTERY CHARGING SYSTEMS

Filed May 12, 1965 2 Sheets-Sheet 1

INVENTOR
BRAHAM R. FIELD.
BY
WATSON, COLE, GRINDLE & WATSON
ATTORNEYS

United States Patent Office 3,379,953
Patented Apr. 23, 1968

3,379,953
AUTOMATIC BATTERY CHARGING SYSTEMS
Braham Rowley Field, Redditch, England, assignor to Alkaline Batteries Limited, Redditch, England, a company of Great Britain
Filed May 12, 1965, Ser. No. 455,138
Claims priority, application Great Britain, May 19, 1964, 20,641/64
6 Claims. (Cl. 320—34)

ABSTRACT OF THE DISCLOSURE

An automatic battery charging system is described for charging a plurality of nickel-iron cells in series with at least one nickel-cadmium cell. The characteristic sharp voltage increase towards the end of the charging period in a nickel-cadmium battery serves, by means of an amplifier which compares this voltage against a standard voltage, to actuate a timing device. The timing device in turn, after a preselected period of time, operates a switch to shut off the charging apparatus. Automatic charging of nickel-iron batteries without the nickel-cadmium battery is not possible since there is no characteristic voltage increase a short time before complete charging of the batteries.

---

Figure 1:
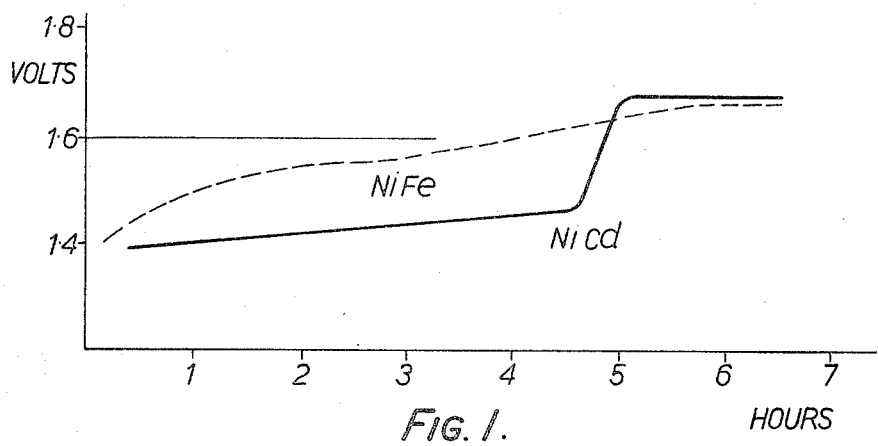

This invention relates to automatic battery charging systems and is concerned with providing a system for automatically charging batteries of nickel-iron type.

For batteries of lead-acid and nickel-cadmium types a system widely and successfully employed is known as the voltage timing system. It is not satisfactory to rely merely on terminating the charge when the voltage reaches a certain maximum value, since the final voltage depends on the age of the battery, its temperature and even the supply voltage, so that whatever voltage setting were adopted the charge would either be terminated too soon under certain conditions, or would never be terminated at all under certain other conditions. On the other hand it has been found that the periods required by cells in different states of discharge to reach full charge, after they have reached some intermediate voltage, are substantially equal. Accordingly, in the voltage timing system a timer is started when the battery reaches a certain voltage, for example 2.35 volts per cell for a lead acid cell, or 1.6 volts per cell for an alkaline cell, and after the timer has been in operation for a fixed time, say three to four hours for a lead-acid cell, or two to three hours for an alkaline cell, the charge is terminated.

Whilst such a system is satisfactory for lead acid batteries and for nickel-cadmium batteries, it is not satisfactory for nickel iron-batteries. In the case of a nickel-cadmium battery the voltage rises very slowly for the majority of the charge, and then, towards the end of the charge, it begins to rise very much more rapidly, so that the time at which the voltage per cell passes through a value of, say 1.6 is comparatively clearly defined.

On the other hand with a nickel-iron battery the rate of rise of voltage is highest at the beginning of the charge, after which it continues at a slow but progressive rate until almost the end of the charge. In addition the voltage per cell varies considerably with temperature and these variations can in fact sometimes exceed the increase in voltage during charge. Accordingly, the period of charging before a nickel-iron cell will reach the given voltage can vary very widely indeed with temperature. As a result it has hitherto been impossible to employ a voltage timing system with nickel-iron batteries, and it has been necessary to fall back upon a system of determining the depth or discharge by means of an ampere hour meter, which must, of course, accompany the battery during its discharge, and therefore, in the case of a vehicle, will suffer from vibrations and road shocks which may impair its reliability.

According to the present invention, at least one nickel-iron cell is replaced by a nickel cadmium cell, and the voltage across the latter is employed to determine the start of the timed period before the conclusion of the charge in a voltage timing system.

Thus, an automatic battery charging system for charging a battery in accordance with the present invention comprises a number of nickel-iron cells, in which one or more pilot cells of nickel-cadmium type are connected in series with the nickel-iron cells, and means are provided responsive to the voltage of the nickel-cadmium cell for actuating a timer to start a timed period, and means controlled by the timer for switching off the charge at the end of the set period.

Preferably, the pilot cell is of the same capacity as the nickel-iron cells, so that on discharge it functions in a normal manner and makes its contribution to the supply of energy, in addition to serving as a pilot cell for determining when the charge should be terminated.

Various arrangements may be employed for initiating the timed period when the pilot cell reaches a predetermined voltage. In one arrangement the voltage of the pilot cell is compared with a constant reference voltage and the difference is caused to actuate a timer. The reference voltage may be obtained by means of a Zener diode.

The control system may be obtained by modifying an existing control system, such as a so-called Pohler switch or MJV relay designed to respond to the voltage of the complete battery. In such case it may be desirable to employ an amplifier and/or an auxiliary relay to operate the MJV relay in accordance with the voltage of the single pilot cell. In this case it is preferred to employ a transistor amplifier in conjunction with a comparatively robust auxiliary relay. In the case of a vehicle battery such components may be mounted on the vehicle without disadvantage, in which case the terminal of the MJV relay may be provided with a flexible lead which can either be plugged in in the normal way for charging nickel-cadmium batteries, or can be plugged into a suitable socket on the vehicle so as to be controlled by the nickel-cadmium pilot cell when the remaining cells are of nickel-iron type.

Figure 2:
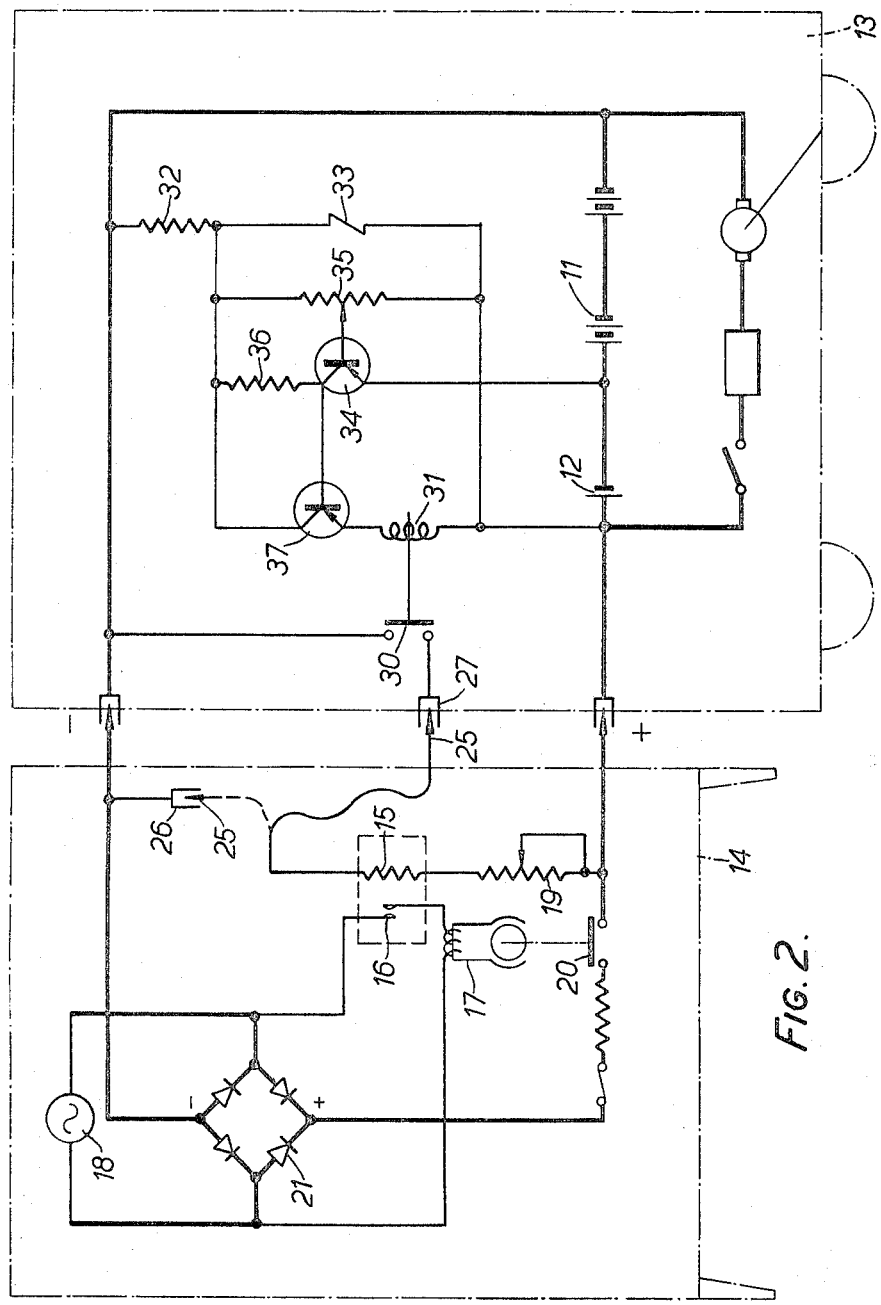

The invention may be put into practice in various ways but one specific embodiment will be described by way of example with reference to the accompanying drawings, in which:

FIGURE 1 is a graph showing how the charging voltage rises with time when charging two different types of battery, and FIGURE 2 is a circuit diagram of one form of charging arrangement for a vehicle battery.

FIGURE 1 shows typical graphs of the way in which the rise of charging voltage with time of nickel-iron batteries compares with that of nickel-cadmium batteries. Thus in the case of the nickel-cadmium battery the graph, shown in full lines, indicates that the voltage rises slowly during the majority of the charging period, and then, towards the end of the charge, it begins to rise much more steeply, so that the time at which the voltage per cell passes through a value of say 1.6 is comparatively clearly defined.

On the other hand the graph for the nickel-iron battery shown in broken lines, indicates that the rate of rise of voltage is highest at the beginning of the charge after which it continues to rise at a slow but progressive rate almost until the end of the charge. The problems to which this leads have been referred to above.

FIGURE 2 is a circuit diagram of an automatic battery-charging system for a vehicle battery of nickel-iron type, in which, in accordance with the invention, one nickel-iron cell is replaced by a nickel-cadmium cell. The equipment incorporates a standard MJV relay and can be operated in the conventional manner if it is desired to charge batteries of nickel-cadmium type.

The battery, comprising 23 nickel-iron cells 11 in series with a single nickel-cadmium cell 12 of the same capacity, is mounted in a vehicle 13 which it drives, whilst the MJV relay is mounted on a static charging panel 14. The MJV relay comprises a coil 15, which may in fact comprise a hot wire enclosed in a sealed tube, which in normal use would be connected directly across the battery. This controls contacts 16 connected in series with a synchronous clock mechanism 17 across an A.C. supply 18, so as to start the clock when the battery voltage exceeds a predetermined value. An adjustable resistor 19 may be included in series with the relay coil in order to adjust the voltage at which the timer is started. The timer actuates a mercury contact 20 in series with the charging circuit, so as to terminate the charge after a predetermined time interval after the battery reaches a predetermined voltage.

In applying the present invention, one terminal of the relay coil is connected, through the mercury contact, to the positive terminal of a D.C. supply, shown as a rectifier 21, while its other terminal is connected to the negative terminal of the supply through a flexible lead and plug 25 and socket 26. The plug can be transferred to another socket 27 in the vehicle, so as to connect the relay coil through the contacts 30 of an auxiliary relay 31 to the negative terminal. The auxiliary relay is controlled through a transistor amplifier in accordance with the difference between the voltage of the single nickel-cadmium pilot cell and a reference voltage obtained from a Zener diode.

Thus, a resistor 32 and a Zener diode 33 are connected in series between the negative and positive terminals of the complete battery, the Zener diode and the pilot cell both being connected to the positive terminal. A transistor 34 has its base connected to the tapping of a potentiometer 35 connected across the Zener diode, and its emitter connected to the negative terminal of the pilot cell.

Accordingly the potential difference between the base and emitter represents the difference between the voltage of the pilot cell and a constant reference voltage which is a proportion of that across the Zener diode. The negative terminal of the Zener diode is connected through a collector resistor 36 to the collector of the transistor 34, and directly to the collector of a second stage transistor 37, whose base is connected to the collector of the first stage transistor while its emitter is connected through the coil 31 of the auxiliary relay to the positive terminal of the battery.

Accordingly, as the voltage of the pilot cell rises, the emitter of the first stage transistor 34 becomes more negative in relation to its base, and, at a certain point, determined by the setting of the potentiometer 35, the transistor 34 cuts off, causing the second stage transistor 37 to conduct and closing the auxiliary relay contacts 30 to start the timer. Whereas the voltage of the complete battery rises slowly, and the rate of rise tends to decrease as the charge proceeds, the rate of rise of voltage of the pilot cell increases comparatively sharply at a certain point in the latter part of the charging period, and this provides a clearly defined indication that the charge has reached a certain stage and will be completed by a further predetermined period of charging.

The timer maintains the charge for an appropriate period and then interrupts the charging circuit by opening its mercury contacts.

What I claim as my invention and desire to secure by Letters Patent is:

1. An automatic battery charging system for charging a battery comprising a plurality of nickel-iron cells and at least one pilot cell of the nickel-cadmium type connected in series with the nickel-iron cells; a charging supply; a timer for controlling said charging supply; means responsive to a change in voltage of the nickel-cadmium cell for actuating said timer to start a timed charge period comprising means for providing a constant reference voltage, an amplifier for comparing the voltage of the pilot cell with said reference voltage, and relay means responsive to a predetermined difference in said voltages to actuate said timer; and means controlled by the timer for switching off the charge at the end of said period.

2. A system as claimed in claim 1 in which the pilot cell is of the same capacity as the nickel-iron cells.

3. A system as claimed in claim 1 in which said means for providing a reference voltage comprises a Zener diode.

4. A system as claimed in claim 1 wherein said relay means to actuate said timer comprises a main relay and an auxiliary relay.

5. A system as claimed in claim 4 for charging a vehicle battery, in which the amplifier and auxiliary relay are mounted on the vehicle.

6. A system as claimed in cliam 5 in which one terminal of said main relay is connected to one terminal of the charging supply and means is provided for alternatively connecting the other terminal of said main relay to the other terminal of said charging supply and said auxiliary relay.

References Cited

UNITED STATES PATENTS

| | | | |
|---|---|---|---|
| 3,321,690 | 5/1967 | McCarthy et al. | 320—40 X |
| 2,334,289 | 11/1943 | Richards | 320—34 |
| 2,510,141 | 6/1950 | Richards | 320—34 |
| 3,176,210 | 3/1965 | Bethke | 320—40 |
| 3,178,629 | 4/1965 | Saslow | 320—23 |
| 3,241,029 | 3/1966 | Slomski | 320—40 |
| 3,302,091 | 1/1967 | Henderson | 320—48 |

JOHN F. COUCH, *Primary Examiner.*

WARREN E. RAY, *Examiner.*

S. WEINBERG, *Assistant Examiner.*